United States Patent

[11] 3,578,382

[72] Inventor Robert Servadio
    3721 Parkview Ave., Pittsburgh, Pa. 15213
[21] Appl. No. 804,423
[22] Filed Mar. 5, 1969
[45] Patented May 11, 1971

[54] AUTOMATIC SAFETY SEAT CLAMP
    11 Claims, 9 Drawing Figs.
[52] U.S. Cl. .................................................. 297/390
[51] Int. Cl. .................................................. B60r 21/10,
    A47c 31/00
[50] Field of Search .......................................... 297/384,
    390; 280/150 (B); 244/122.2

[56] References Cited
    UNITED STATES PATENTS
    2,873,122 2/1959 Peras .......................... 297/384X Primary Examiner—Bobby R. Gay
Assistant Examiner—James C. Mitchell
Attorney—William J. Ruano ABSTRACT: An automatic safety seat clamp adapted to be moved in front of an occupant of a vehicle seat, to restrain him from being thrown forwardly during an accident. The safety clamp is automatically raised from a low retracted position in response to the occupant's body pressure which actuates a switch on the seat backing. The clamp encircles the occupant in response to foot pedal action. The clamp is retracted by motor power in response to another foot pedal action.

INVENTOR.
ROBERT SERVADIO
BY William J. Ruano
ATTORNEY

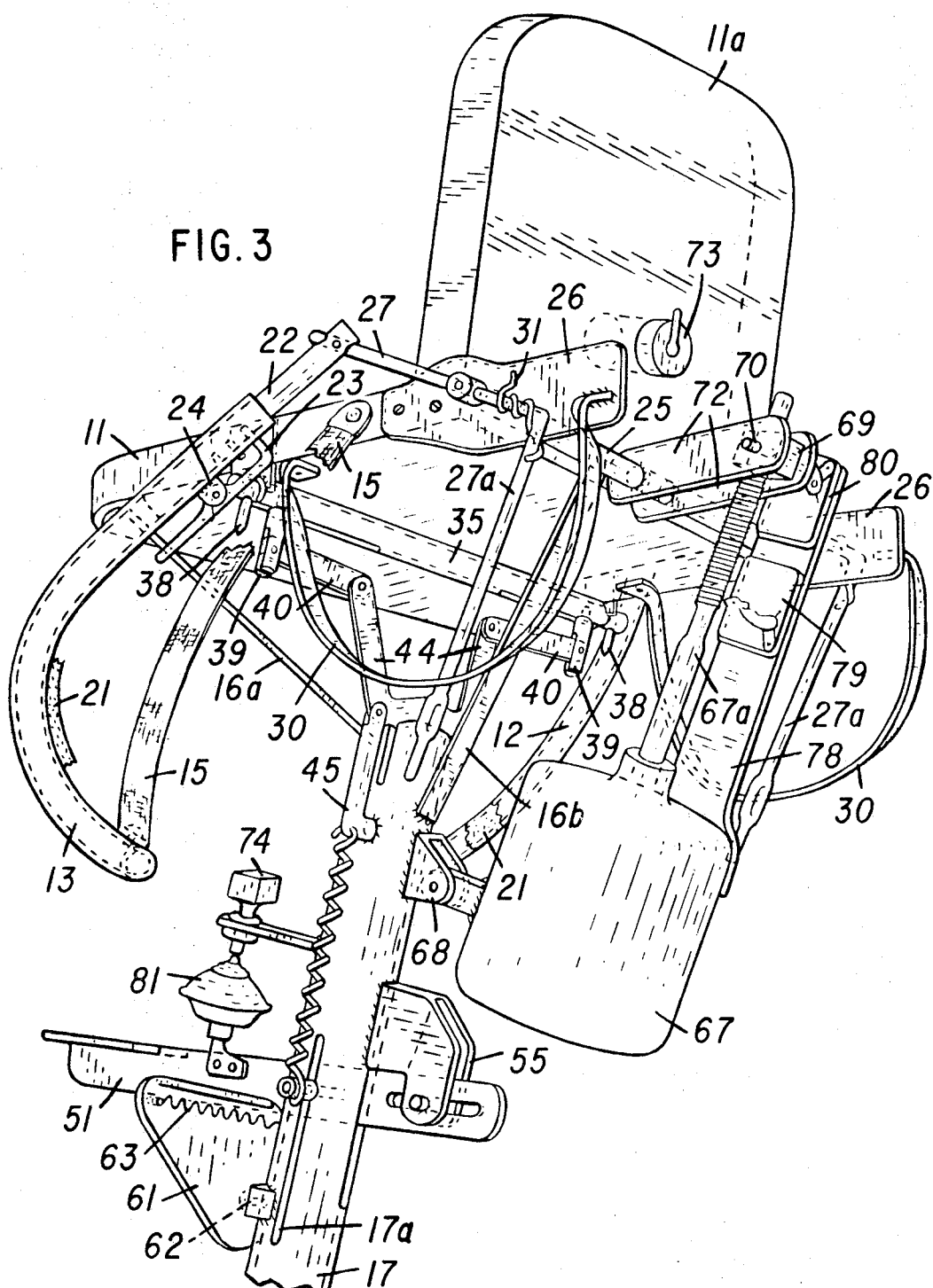

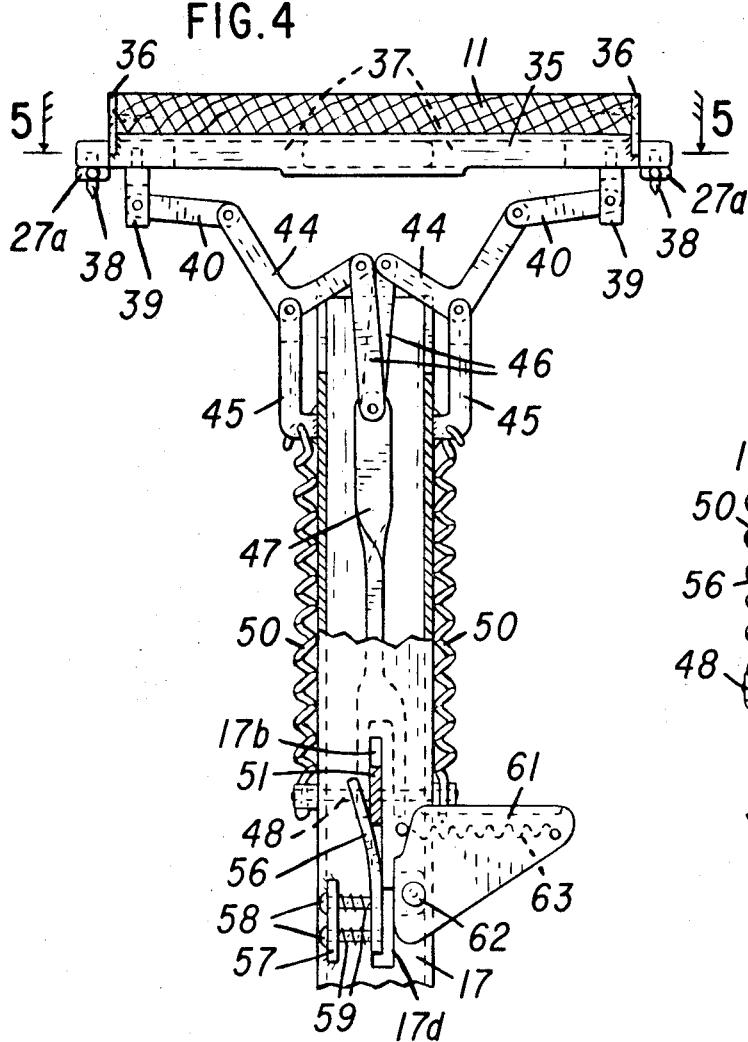
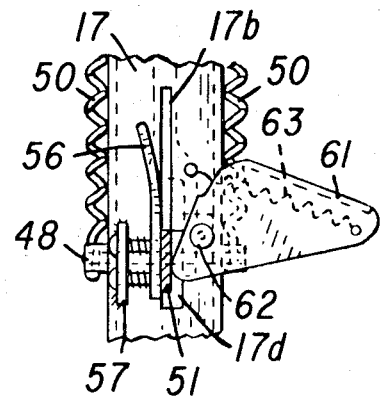
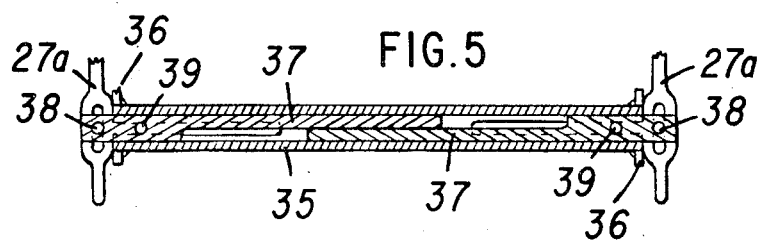

INVENTOR.
ROBERT SERVADIO
BY *William J. Ruano*
ATTORNEY

AUTOMATIC SAFETY SEAT CLAMP

This invention pertains to an automatic safety seat clamp that has automatic restraining elements which can prevent an occupant of a vehicle seat from being thrown forwardly, during an accident, against rigid portions of the vehicle.

The safety clamp would be especially suitable for providing protection to an operator of a delivery truck who must make frequent stops to make deliveries and for pickups of mail, milk and the like.

The occupant cannot easily circumvent the protective elements since the occupant's body triggers the restraining elements to force them to move towards partially protective positions when the occupant takes his position in the seat. When the restraining elements are in partially protective positions, they are a hindrance or obstruction to the occupant thus he is forced to further move the restraining elements.

An occupant such as an operator of a truck that makes frequent stops, tends to refrain from using conventional safety belts because it would take considerable time and effort to couple and uncouple a safety belt many times a day. The seat clamp would also be useful for the safety of a passenger since he could not easily circumvent the protective restraining elements.

An object of the present invention is to provide novel, automatic clamp means responsive to seating movement by the occupant to apply a restrainer about his midsection, driven by operation of a releasing mechanism by the operator.

A more specific object of the invention is to provide an automatic, reversible motor driven means for moving restrainer clamps vertically upwardly in response to his leaning against the back of his seat and which is quickly releasable in response to his operation of a mechanical unlatching means, whereby such operation may be performed very rapidly without the use of the occupant's hands.

Other objects and advantages will become more apparent from a study of the following description, taken with the accompanying drawings wherein:

FIG. 3 is a view similar to FIG. 2 but showing protective elements in retracted positions;

FIG. 4 is a fragmentary elevational sectional view showing details of the mechanism for closing and opening restrainers;

FIG. 5 is a sectional view taken along line 5–5 of FIG. 4;

FIG. 6 is a fragmentary elevational view similar to a portion of FIG. 4, but showing parts in different positions;

Figure 1:
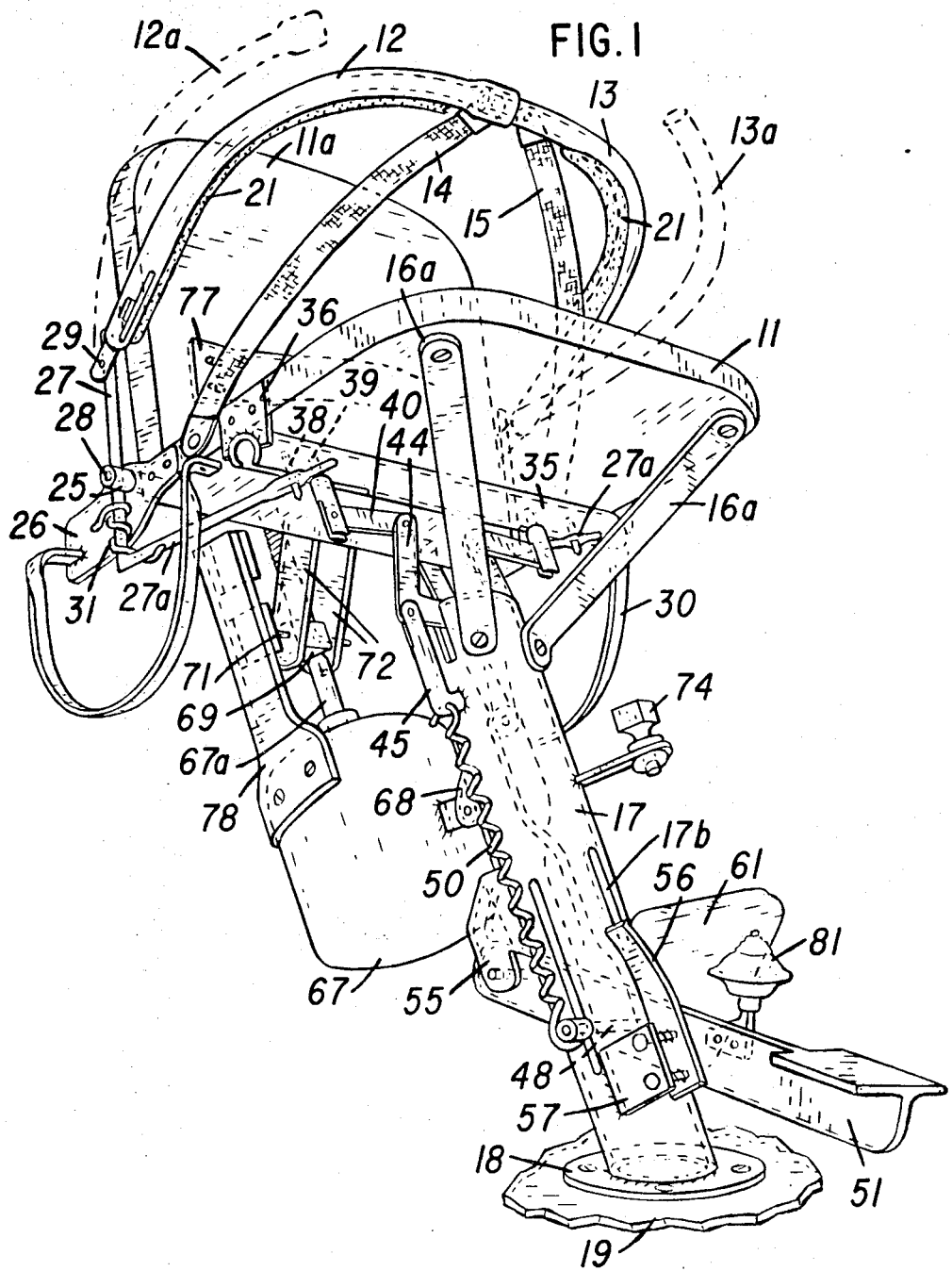
FIG. 1 is a perspective elevational view showing the front and side of a vehicle seat having an automatic safety seat clamp embodying the present invention.
Figure 2:
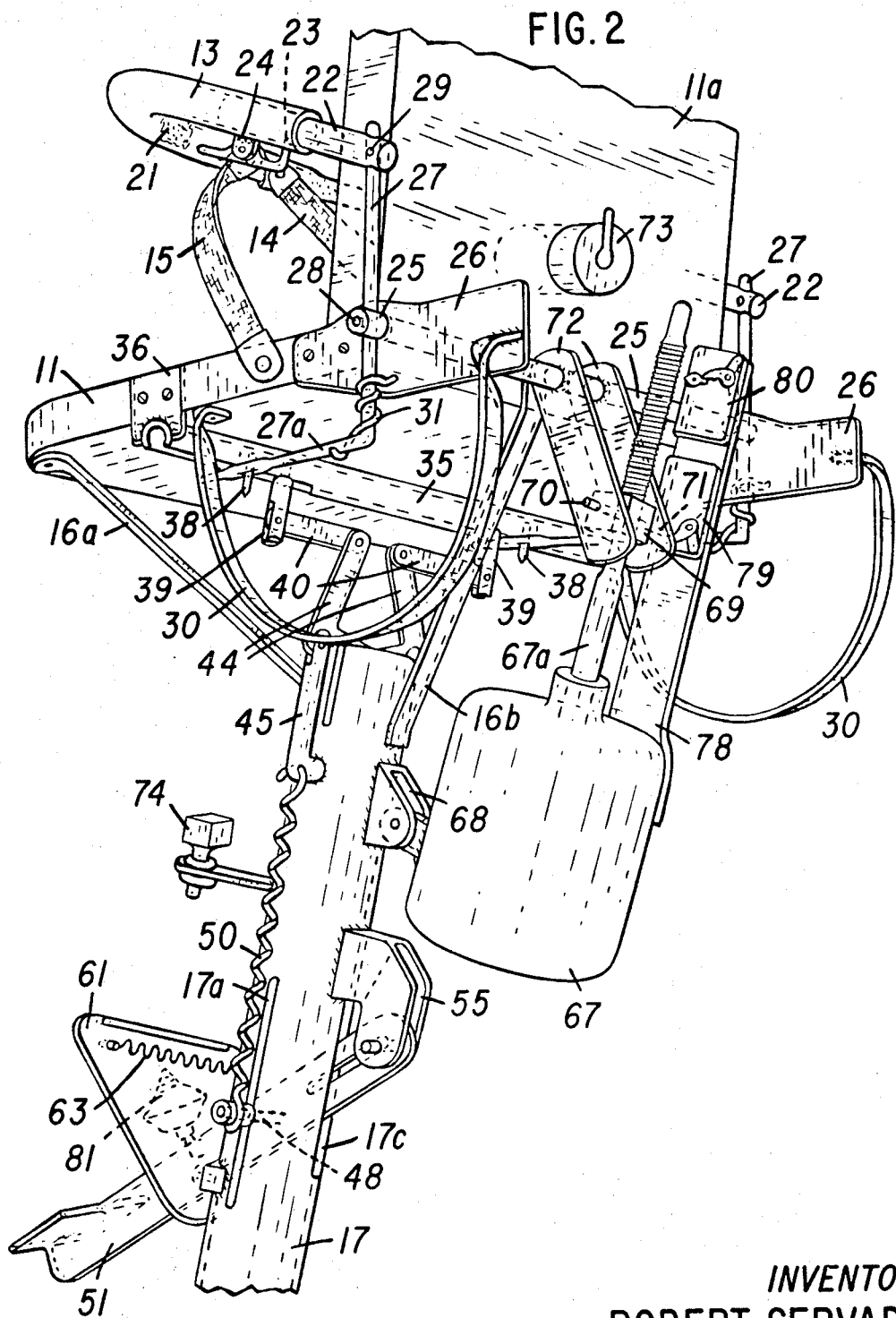
FIG. 2 is a perspective elevational view showing the rear and the other side of the seat.

Referring more particularly to the drawings, FIGS. 1 and 2 show a vehicle seat 11 along with restrainer clamp arms 12 and 13, and restrainer seat belts 14 and 15. The restrainers are positioned so as to restrain an occupant of the seat 11 from being thrown forwardly or aside by momentum forces during a collision.

The occupant may be an operator or a passenger of a vehicle. For purposes of illustration, the seat 11 shown is similar to the seat for an operator of a delivery truck.

FIG. 3 shows the restrainers in fully retracted positions. Phantom outlined positions 12a and 13a shown in FIG. 1, indicate lateral retracted positions of the arms 12 and 13. The arms 12 and 13 are preferably made of rigid tubular construction. The belts 14 and 15 may be made of nylon fabric or the like, so they can stretch slightly to cushion the occupant.

The rear ends of belts 14 and 15 are fastened to the seat 11. The forward end of belt 14 is fastened to the arm 12. The forward end of the belt 15 is fastened to the arm 13.

The seat 11 has a back portion 11a. The seat 11 is mounted on bars 16a and 16b. A strong tube 17 supports the bars 16a and 16b (FIG. 1). A flange 18 is welded to the bottom of the tube 17. The flange 18 is fastened to the vehicle's floor structure 19. Soft cushioning or padding 21 may be fastened to the surfaces of the arms 12 and 13 that confront the occupant of the seat 11. The seat 11 is shown as being made of wood, but it may be made of metal or plastic. A cushion (not shown) may be mounted on the seat 11.

Arms 12 and 13 may be made wholly of strong metal tubing such as aluminum, steel or alloys thereof. The arms may be made more useful by using a solid round rod 22 (FIG. 2) to connect each tube to a shaft 27, as shown in detail in FIG. 3. Each tube is connected to a rod 22 with a pin 23 (FIG. 2). Each pin 23 may be mounted on a tube with a clevis 24 that has a spring to force the pin 23 into engagement with the rod 22. The rod 22 may have a series of holes to which the pin 23 may be selectively engaged to allow the arms to be adjusted outwardly. The pin 23 has a handle that can be pressured to retract the pin from the roof 22. The pin 23 can be retracted to allow quick emergency removal of the arm when the mechanism for retracting the arms is deformed during a collision, thereby preventing the occupant from being trapped.

A horizontal shaft 25 is mounted on the rear of the seat 11 with a pair of plates 26 to serve also as a seat hinge. Each end of the shaft 25 has a transverse hole to which an L-shaped shaft 27 is pivotally engaged. A key 28 at the end of shaft 25 has a nonthreaded end that projects loosely into a keyway like groove that encircles a shaft 27, thereby allowing the shafts 27 to pivot while maintaining their relative positions with the shaft 25.

Arms 12 and 13 are keyed to slightly flattened portions of the shafts 27 with setscrews 29 or the like, the setscrews 29 allow the arms 12 and 13 to be adjusted vertically. The arms 12 and 13 may be adjustably positioned so their rear ends are as low as possible, so the padding 21 bears against the midsection below the occupant's hip bones, thereby eliminating the need for the belts 14 and 15.

The arms 12 and 13 may be positioned high as shown in FIG. 1, so as to confront the midsection at the occupant's chest, thereby restraining the upper portion of the occupant's torso from pivoting downwardly during a rapid deceleration caused by a collision accident, thus eliminating the need of a shoulder harness. When the arms 12 and 13 are positioned high to confront the chest, the belts 14 and 15 can restrain the lower portion of the torso from objectionably moving forward on the seat 11. When the arms 12 and 13 are positioned high, as shown in FIG. 1, the upper portions of the shafts 27 can bend slightly to cushion the occupant when he is forced against the arms. Spring steel may be used so that any give would not result in a permanent bend.

The clamp arms 12 and 13 may be adjusted so the occupant's body bears almost wholly against belts 14 and 15, whereby the arms 12 and 13 act as positioners to position the belts in protective positions.

A pair of U-shaped limit bars 30 are fastened to the seat 11 and to plates 26. Each shaft 27 holds a coiled spring 31 (FIG. 1), that tends to force the shaft to pivot so the shafts lower portion 27a pivots outwardly and bears against the inner edge of the adjacent bar 30. Springs 31 are motors that help to force the arms 12 and 13 into lateral retracted positions when the arms are free to move laterally. The shafts 27 are forced to pivot laterally about their axes to couple the arm 12 to the arm 13 and they are forced to pivot oppositely to retract the arms to the positions 12a and 13a.

FIGS. 4 and 5 show the details of the mechanism that causes the shafts 27 to pivot laterally. A strong tube 35 (FIG. 2) is welded to a pair of plates 36 (FIG. 2). The plates 36 are fastened to the seat 11. A pair of round shafts 37 has a half-round portion to allow the shafts to slidably engage each other. Each shaft 37 holds a pin 38 (FIG. 4) which is press-fitted or threaded to it. The end portions of the tube 35 are slotted to allow pins in the shafts 37 to move laterally.

Each pin 38 is engageable with a slot in a shaft lower portion 27a (FIG. 4). A slotted fastener 39 (FIG. 4) is press-fitted or threaded to each shaft 37. A pair of links 40 are pivotally connected to the fasteners 39 and to a pair of bellcranks 44. The bellcranks 44 are pivotally mounted on a pair of fasteners 45. The fasteners 45 are welded to the tube 17. A pair of links 46 are pivotally connected to the bellcranks 44 and to a main link 47. The link 47 has a clevis shaped lower portion that engages a slidable pin 48. The pin 48 slidably engages a pair of slots 17a (FIG. 2) in the tube 17. A pin 48 has a head and a nut, each of which has a groove to anchor a lower end of one of two springs 50. The upper ends of the springs 50 are hooked into the fasteners 45. The springs 50 are the motors that supply the major forces that retract the arms 12 and 13 when the arms are free to move laterally.

A rocker control pedal bar 51 is pivotally engaged with the pin 48 (FIGS. 1 and 2). The pedal 51 is pivotally and slidably engaged with a clevis 55. The clevis 55 is welded to the tube 17. The pedal 51 slidably engages slots 17b and 17c in the tube 17.

The occupant depresses the front portion of the pedal 51 to cause the arms 12 and 13 to close so they engage each other with plug and socket type engagement. When the pedal 51 is depressed, it engages a notch 17d (FIG. 4) in the tube 17, to prevent the pedal from rising after the occupant removes his foot from the pedal. A curved bar 56 (FIG. 1) forces the front of the pedal 51 aside into the notch 17d. The bar 56 is slidably mounted on a plate 57. The plate 57 is welded to the tube 17. A pair of pins 58 slidably engage the plate 57 and threadably engage the bar 56. A pair of springs 59 pressure the bar 56.

A release control pedal 61 is pivotally mounted on the tube 17 with a pin 62. The pedal 61 is depressed by the occupant's foot to the position shown in FIG. 6, to cause it to push the pedal bar 51 out of the notch 17d, to enable the springs 50 to raise the pin 48 and the linkage connected to it, so as to spread the arms 12 and 13. A return spring 63 forces the pedal 61 to return after the occupant releases the pressure on the pedal.

The depressing of the pedal 61 also causes the arms 12 and 13 to pivot downwardly from the raised positions shown in FIGS. 1 and 2 to the lowered positions shown in FIG. 3, as will be described in detail hereinafter.

An electrical wiring plug 66 is interconnected to the vehicle's electrical power source. A reversible motor 67 is pivotally mounted to a clevis 68 (FIG. 2). The clevis 68 is welded to the tube 17. The motor 67 has a long threaded shaft 67a that engages a threaded block 69. The block 69 has pins 70 and 71 pressed into it. The pins 70 and 71 pivotally engage a pair of bars 72. The bars 72 are welded to the shaft 25 (FIG. 3). The motor 67 raises and lowers the arms 12 and 13 in response to switches 73 and 74.

Figure 7:
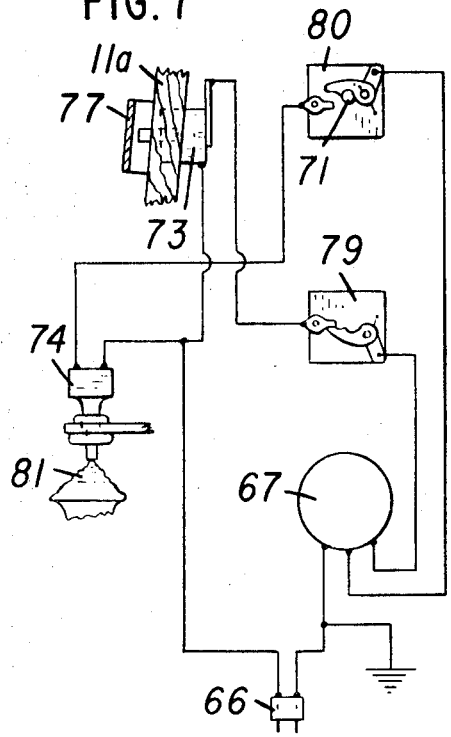
FIG. 7 is a schematic diagram showing the electrical circuit for the safety seat clamp.

When the occupant positions himself in the seat 11, his back depresses a thin horizontally bowed band 77 (FIG. 1) that is mounted with screws onto the seat back 11a. The band 77 has slotted holes to allow at least one end to slide and to allow the band to flatten to an extent from the pressure of the occupant-'a back against it. When the band 77 flattens to a predetermined extent, it depresses an actuating member of a switch 73, (see FIG. 7). The switch 73 closes an electrical circuit that activates the motor 67 causing the motor shaft 67a to rotate and force the block 69 downwardly from the position shown in FIG. 3 to the position shown in FIG. 2, thereby causing the shaft 25 to pivot and raise the arms 12 and 13.

A circuit breaker support 78 (FIG. 1) is mounted on the motor 67. A lower circuit breaker 79 and an upper circuit breaker 80 (FIG. 2) are mounted on the support 78.

When the motor 67 causes the threaded block 69 (FIG. 2) to move downwardly close to its lower position, the pin 71 engages and opens the lower circuit breaker 79, causing the motor 67 to stop.

The pedal 51 has a delayed action dashpot depressor 81 (FIG. 1) attached to it. When the occupant depresses the release pedal 61 and causes the front portion of the pedal 51 to pivot upwardly, the dashpot depressor 81 is forced against a plunger of a switch 74. The switch 74 is mounted on the tube 17. The dashpot depressor 81 causes the plunger of the switch 74 to close a circuit in the switch, thereby activating the motor 67 causing the shaft 67a to rotate in an opposite direction, causing the block 69 to rise, and the arms 12 and 13 to move downwardly. When the pin 71 (FIGS. 2 and 7) reaches the upper circuit breaker 80, it breaks the circuit causing the motor 67 to stop. After the motor 67 has stopped, the upper end of the depressor 81 shrinks downwardly as air bleeding action takes place, thus opening the circuit of switch 74.

The circuit breakers 79 and 80 are adjustably positioned on the support 78 to suit the preferred limits of the vertical movements of arms 12 and 13.

All the above action takes place without the operator ever having to use his hands, which is the basic idea for the present safety clamp. Such action can take place while the vehicle is moving or is stopped, depending upon the operator's desires, therefore it saves considerable time of the operator.

When the arms 12 and 13 are in the raised but laterally retracted positions 12a and 13a, they would tend to obstruct the movement of the occupant's arms. Thus the occupants will depress the pedal 51 to cause the arms 12 and 13 to pivot close to his body where they would not hinder his arm movements.

Figure 8:
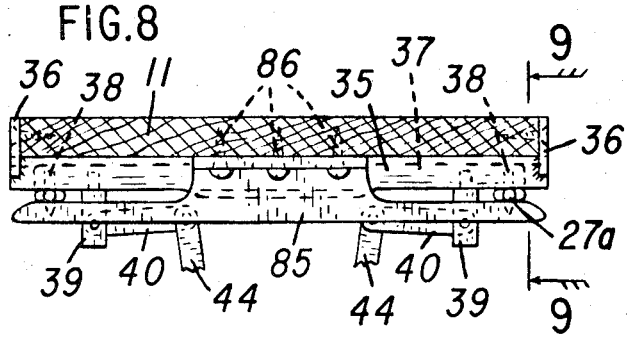
FIG. 8 is an elevational view showing a security lock bar for use with the mechanism shown in FIGS. 1, 2 and 3; and, FIG. 9 is a fragmentary sectional view taken along line 9–9 of FIG. 8.
Figure 9:
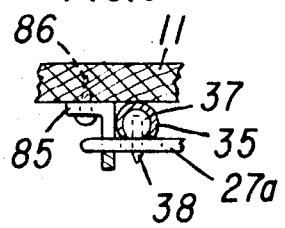

FIGS. 8 and 9 show a modification having a security lock bar 85, positioned in front of the tube 35, on the bottom of the seat 11. The bar 85 is an angle shape, that is fastened to the seat 11 with screws 86. The bar 85 may be welded to the tube 35 to make its mounting to the seat stronger. Each end of the bar 85 is recessed so the shaft portions 27a can bear down against it if there is failure of the power transmitting parts connecting the motor 67 with the shafts 27 while the arms 12 and 13 are in protective positions, or while the arms are being pivoted laterally into protective positions. The bar 85 allows the power transmitting parts connecting the motor 67 and the shafts 27 to be just strong enough to raise and lower the arms 12 and 13 since the thrust of the occupant against the arms 12 and 13 would be diverted against the bar 85.

As a modification of the invention, the electric motor, when actuated by the switch located on the seat, may cause the restraining means to not only pivot upwardly from the retracted position below the seat, but it could also cause the restrainer means to completely encircle, rather than partially encircle, the occupant. Conversely, to free the occupant, operation of the pedal could not only cause lateral retraction, but downward retraction as well to the position below the seat in response to operation of the electric motor. In short, each of the entire operations of clamping the restraining means and unclamping it may be electric motor operated if so desired.

Thus it will be seen that I have provided a highly efficient automatic device for quickly and easily attaching or applying and retracting restraining elements which serve in the same manner as safety seat belts in automotive vehicles and the like; furthermore, I have provided a motor driven mechanism for accomplishing the application and retracting of said restraining elements in a quick and secure manner without the necessity of the use of the operator's hands; but by the mere seating of the occupant and his depression of a pedal, whereby use of the safety mechanism will be greatly encouraged even in cases of mail delivery men, milk men and the like who make very frequent stops, therefore who must apply and remove the restraining elements numerous times per hour.

While I have illustrated and described a single specific embodiment of my invention, it will be understood that this is by way of illustration only and that various changes and modifications may be made within the scope of the following claims.

I claim:

1. In combination with a seat in a vehicle, a pair of restrainer means, said pair of restrainer means substantially encircling a midportion of the body of an occupant of said seat, said restrainer means including stiff arm portions, support means mounted on rear portions of said seat for supporting said stiff arm portions, said support means including pivotal means to allow said stiff arm portions to be pivoted substantially laterally to the seat, positioning means to hold said stiff arm portions in protective positions substantially encircling said occupant, and lateral retracting means for retracting said stiff arm portions to lateral retracted positions to allow the occupant to remove himself from said pair of restrainer means.

2. Apparatus as recited in claim 1 wherein each of said restrainer means includes a belt that substantially spans from one end to another of the corresponding stiff arm portion of the restrainer means.

3. Apparatus as recited in claim 2 wherein said belt engages the seat and corresponding stiff arm portion so that a substantial portion of said belt bears below the hip bone of said occupant.

4. Apparatus as recited in claim 1 together with control means for releasing said positioning means.

5. Apparatus as recited in claim 1 wherein said pivotal means includes vertical retraction means to effect downward retraction of said pair of restrainer means from said lateral retracted positions.

6 Apparatus as recited in claim 1, together with means for adjusting the length of said stiff arm portions to fit about occupants having difficult body sizes.

7. Apparatus as recited in claim 4 wherein said lateral retracting means includes spring means responsive to movement of said control means.

8. Apparatus as recited in claim 5 together with motor means for effecting said downward retraction.

9. Apparatus as recited in claim 8 together with a switch located on said seat and wherein said motor means causes said pair of restrainer means to pivot upwardly from low retracted positions to said lateral retracted positions in response to pressure of said occupant's body against said switch as the result of seating of said occupant.

10. Apparatus as recited in claim 9 together with a pedal control for laterally retracting said stiff arm portions and moving them downwardly below the seat.

11. Apparatus as recited in claim 1 together with motor means for retracting said stiff arm portions to enable the occupant to be freed of said restrainer means.